F. CHICHESTER.

Cradles.

No. 5,683. Reissued Dec. 16, 1873.

Witnesses:
H. C. Mattenberg
W. Lovell

Inventor:
Franklin Chichester
per G. M. Zinkeisen
Atty

AM. PHOTO-LITHOGRAPHIC Co. N.Y. (OSBORNE'S PROCESS)

UNITED STATES PATENT OFFICE

FRANKLIN CHICHESTER, OF MILWAUKEE, WISCONSIN, ASSIGNOR TO HIMSELF AND LEMUEL A. CHICHESTER, OF PHOENICIA, NEW YORK.

IMPROVEMENT IN CRADLES.

Specification forming part of Letters Patent No. 141,033, dated July 22, 1873; reissue No. 5,683, dated December 16, 1873; application filed October 27, 1873.

*To all whom it may concern:*

Be it known that I, FRANKLIN CHICHESTER, of Milwaukee, in the county of Milwaukee and State of Wisconsin, have invented a new and useful Improvement in Spring-Cradles, of which the following is a specification:

The object of this invention is to improve the action of spring cradles and cribs for children; and it consists in a central pivot at each end of the cradle, attached either to the body or to the base of the crib or cradle, in combination with a spring or springs.

Figure 1:
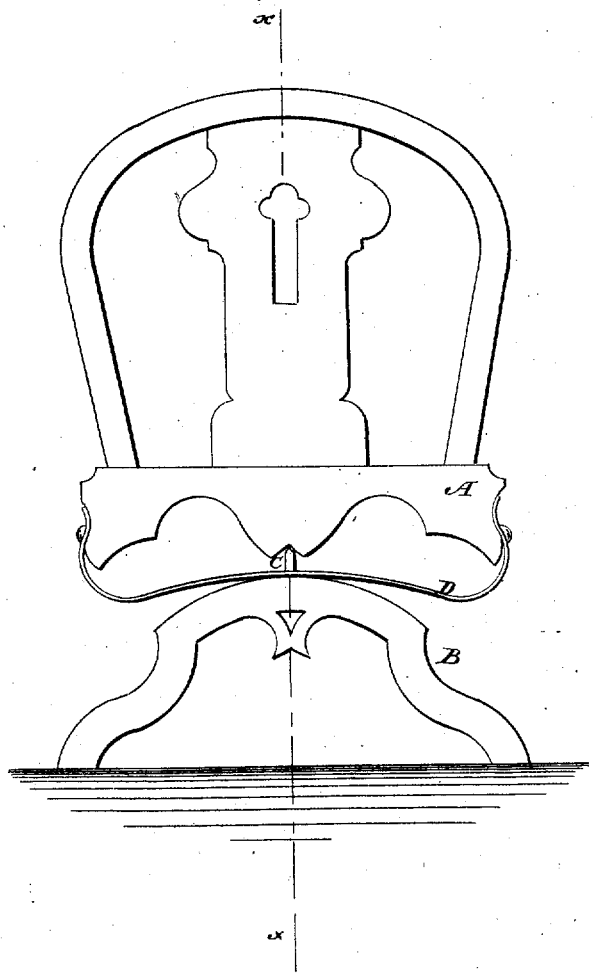
Figure 2:
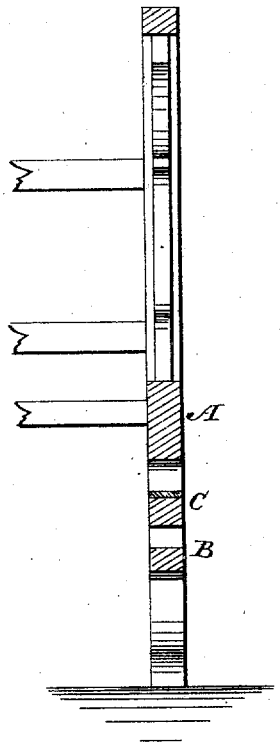

In the accompanying sheet of drawings, Figure 1 is an end elevation, and Fig. 2 is a vertical section of Fig. 1 taken on the line *x x*.

Similar letters of reference indicate corresponding parts.

A is the end cross-rail of the crib or cradle. B is the base or foundation piece at each end. C is the pivot at each end. This pivot may be in any form, either round or flat. It is preferably a flat plate, with the bearing-point similar to the knife-edges of weighing-scales, and may be attached to either the body or the base-piece. To maintain the pivotal point in one position, the edge may be confined in an angle or V, of either wood or metal. D is a spring, one of which is placed at each end of the cradle. These springs may rest upon the base-piece, and be attached to the cross-rail of the body, or vice versa.

Having thus described my invention, what I claim as new, and desire to secure by Letters Patent, is—

A child's cradle with pivots and springs placed between the cross-rails and base-pieces, to support and allow the cradle to swing thereon, substantially as shown and described.

FRANKLIN CHICHESTER.

Witnesses:

JOHN J. DONOHUE,
GEO. R. TROWELL.